United States Patent
Chinchen et al.

[15] 3,650,713
[45] Mar. 21, 1972

[54] STEAM REFORMING OF HYDROCARBONS

[72] Inventors: Godfrey Charles Chinchen; Thomas Cecil Hicks, both of Stockton-on-Tees, England

[73] Assignee: Imperial Chemical Industries Limited, London, England

[22] Filed: May 12, 1970

[21] Appl. No.: 36,690

[30] Foreign Application Priority Data

May 20, 1969   Great Britain......................25,627/69

[52] U.S. Cl..............................48/214, 252/373, 252/455, 252/456, 252/457, 252/458, 252/459, 252/462
[51] Int. Cl............................................C01b 2/14, B01j 11/06
[58] Field of Search....................48/214, 196; 252/459, 455, 252/456, 457, 458, 462, 373

[56] References Cited

UNITED STATES PATENTS

| | | | |
|---|---|---|---|
| 3,421,871 | 1/1969 | Davies | 48/214 |
| 3,432,443 | 3/1969 | Davies et al. | 48/214 |
| 3,476,536 | 11/1969 | McMahon | 48/214 |

Primary Examiner—Morris O. Wolk
Assistant Examiner—R. E. Serwin
Attorney—Cushman, Darby & Cushman

[57] ABSTRACT

A continuous process of steam reforming hydrocarbons with decreased carbon-lay-down is carried out over a substantially alkali-free catalyst comprising nickel or cobalt metal and the dioxide of zirconium on a pre-formed refractory support.

8 Claims, No Drawings

STEAM REFORMING OF HYDROCARBONS

This invention relates to a process of steam reforming hydrocarbons and to catalysts therefor.

The process of steam reforming hydrocarbons has become established as the preferred source of hydrogen-containing gases for such uses as town gas, ammonia synthesis, oxo-synthesis, methanol synthesis and hydrogenation. When the hydrocarbon feedstock to be used is normally liquid or contains a substantial proportion of unsaturated hydrocarbons, or when high throughputs are required, the steam reforming process requires special catalysts if it is to be operated without forming byproduct carbon. These catalysts were not invented until the 1960's, and contain usually nickel, a refractory support and an alkali metal compound. Such a process has attained large scale industrial operation, but requires improvement as a result of the volatility of the alkali constituent of the catalyst.

It has been proposed to carry out the steam reforming of hydrocarbons with the aid of substantially alkali-free nickel catalysts of a wide variety of types, but it appears that carbon lay-down is difficult to avoid unless such catalysts contain a small quantity of alkali or unless a special heating system for the reactants is adopted. A particular set of catalysts of this low-alkali type are described in our French Pat. No. 1,559,218.

We have now found that the steam reforming process can be carried out using an alkali-free nickel or cobalt catalyst and with reduced carbon lay-down provided the nickel or cobalt is intimately associated with zirconia and provided the structure and the other constituents of the catalyst are chosen carefully.

According to the invention a continuous process of steam reforming hydrocarbons with decreased carbon lay-down is carried out over a substantially alkali-free catalyst comprising nickel or cobalt metal and the dioxide of zirconium on a pre-formed refractory support.

Although by the use of our invention valuable results can be obtained by the use of catalysts having a wide range of compositions, catalysts having particular ranges of composition afford a better combination of activity, resistance to carbon lay-down and economy of manufacture. In the ensuing description of the compositions of preferred catalysts will be defined (unless otherwise stated) as percentages by weight of the nonvolatile constituents of the catalyst in its oxide form, and including the pre-formed support, "nonvolatile" signifying nonvolatile at 900° C.

The proportion of nickel or cobalt in the catalyst is preferably in the range 2-40, especially 5-15% w/w, calculated as NiO or CoO.

The proportion of zirconium oxide $ZrO_2$ apart from any such oxide present in the pre-formed support, is preferably in the range 0.1 to 2.0 times the nickel oxide or cobalt oxide content. Since the catalyst is to be used at high temperatures it is desirable to have present a stabilizer of the crystal structure of the zirconia, preferably an oxide of an alkaline earth metal such as magnesium or calcium, or an oxide of manganese, zinc, aluminum or chromium. The proportion of stabilizing oxide is suitably 1-10 percent by weight of the zirconia.

There may be further alkaline earth oxide present, suitably in a concentration of 0.1 to 2.0 times the zirconia content.

If desired, one or more other oxides may be present, for example those of metals of the A sub-groups of Groups III to VII of the Periodic Table and including the oxides of rare earth metals, scandium, yttrium, titanium, hafnium, thorium, vanadium, niobium, tantalum, chromium, molybdenum, tungsten, rhenium and uranium. Preferably the quantity of such oxides is less, by metal atoms, than the quantity of zirconium.

The pre-formed catalyst support material can be in any of the usual shapes, for example rings, cylinders or (less suitably) irregular lumps or agglomerates. The rings or cylinders can be of regular shape such as results from for example pelleting, or of less regular shape such as results from extrusion. The shapes can have been made by granulation, extrusion, compaction or by the breaking down of larger pieces. The material can be naturally occurring or synthetic or a combination of the two, for example a naturally occurring support held together by a hydraulic cement.

The pre-formed support material preferably has a relatively large mean pore radius, preferably in the range 500 Angstrom units and above, especially above 1,000 Angstroms. It should preferably also be sufficiently porous to absorb more than 20 g. of water per 100 g. of support, especially more than 25 g. Such large mean pore radii and porosities are normally accompanied by low surface areas, for example less than respectively 15 and 8 m.$^2$/g. for aluminas having mean pore radii of 500 and 1,000 Angstrom units, such as can be made by heating active alumina at suitable temperatures above 1,000° C., for example 1,100°-1,500° C.

The pre-formed support material is very suitably alumina. Other materials which can be used singly or in combination or with alumina include magnesia, titania, zirconia, chromia and silica. These materials can be used as natural products, provided that impurities which would poison the catalytic metals are absent or have been removed and provided (for preferred catalysts) that they have the required micromeritic properties or can be endowed with them for example by calcination. Thus for example the support of the catalyst used, in the process of the invention can be made up of bauxite, kaolin, pumice or meerschaum. If the support material contains a substantial proportion of divalent and trivalent oxides, these are preferably present in spinel form to the extent of at least one-third. If the support contains silica, the proportion of silica is preferably less than 5 percent, especially less than 1 percent, and substantial freedom from silica, e.g., under 0.1 percent, is highly desirable.

The support material can be held together for example by sintering or by a hydraulic cement such as Portland Cement or a low-silica aluminous cement or chrome cement.

The catalysts can be made by impregnating the preformed support material with compounds of cobalt or nickel and zirconium, of metals whose oxides stabilize zirconia and also, if desired, further quantities of alkaline earth and other metals as mentioned above as soluble salts which are thermally or hydrolytically decomposable to oxides, especially nitrates. Organic salts can be used, such as formates or acetates. Furthermore, ammine complex compounds such as ammonium zirconyl carbonate, can be used. The concentrations of the impregnating solutions are chosen to give the required proportion of catalytic metal and promoter to pre-formed support, a number of impregnations being carried out if necessary.

Preferably the catalysts are made by a method which comprises first impregnating a pre-formed support material with a zirconium compound and a compound decomposable to a zirconia-stabilizing oxide and subsequently impregnating the resulting treated support with a nickel or cobalt compound.

Preferably the compounds of zirconium and of stabilizer metal are substantially decomposed to oxide before impregnation with the nickel or cobalt compound, at a temperature suitably in the range 400°-800° C., especially 500°-700° C.

The temperature, pressure and steam ratio for the process according to the invention can be in the usual ranges for steam reforming processes according to the composition which the product gas is to have. In addition to steam there can also be present hydrogen or carbon dioxide or both.

As representative temperature ranges there may be mentioned 200°-1000° C. for the generality of steam reforming processes, temperatures up to about 450° C. being suitable for making natural gas substitutes, 400°-600° C. for making methane rich gases, 550°-750° C. for making coal gas replacements, 700°-800° C. for making lean fuel gases and 750° C. upwards e.g., to 900° C. for making synthesis gases for use in making ammonia or methanol or higher alcohols and gases to be further treated to give substantially pure hydrogen. These ranges overlap and their limits are subject to variation according to the pressure and steam ratio of operation. The catalyst of the invention is especially useful for operation at above 700° C.

Representative steam ratios are in the range 1.3 to 8, the lower part of the range (for example up to 4) being suitable for making fuel gases and the upper part (especially 3 to 6) being suitable for making synthesis gas and hydrogen. In this specification the steam ratio is expressed as molecules of steam to atoms of carbon in the feedstock.

The process can be operated at the pressures required in modern steam reforming processes, namely up to about 40 atmospheres absolute and is, owing to the absence of alkali in the catalyst (which alkali is rendered especially volatile by steam at high pressure), capable of use also at still higher pressures such as 60–80 atmospheres.

The invention includes processes in which catalyst as defined herein is used for the whole of the catalyst bed and also those in which one or more other catalysts are used for part of the bed. In one such process the defined catalyst is used at the inlet portion of the bed. In another such process, suitable for use in conditions in which the tendency to carbon lay-down is greater, the defined catalyst is used at the outlet portion (constituting suitably 30 to 70 percent of the bed) and a catalyst containing an alkali metal compound, preferably at least 0.5 percent and up to 11 percent, is used for the inlet portion. By the latter process the volatilization of alkali, although usually present to some extent, can be kept down to a tolerable level.

The feedstocks to be used in the process of the invention can be single hydrocarbons or mixtures, and can be for example methane, gaseous hydrocarbons or normally liquid hydrocarbons. If normally liquid hydrocarbons are used, preferably their boiling range is up to 270° C., especially up to 220° C., for example 170° C. In order to permit long term continuous operation of the process they should be desulphurised to well below 0.5 p.p.m. by weight, and this is conveniently effected by the process of our U.S. Pat. No. 3,063,936. The process is also applicable to the gasification of methanol, alone or in combination with hydrocarbon feedstocks.

EXAMPLE 1

Preparation of Catalyst Oxide Composition

A quantity (300 g.) of 3/16 inch cylindrical alumina pellets which had previously been calcined at 1,450° C. (area 1–2 m.²/g., water absorption porosity 38 mls./100 g.) was soaked for 30 minutes in a solution (600 ml.) containing 170.4 g. of zirconium nitrate and 4.2 g. of calcium nitrate, then drained, dried, and calcined at 500° C. for 8 hours. They were impregnated with nickel nitrate solution in a quantity and at a concentration to apply 10% w/w of NiO to them, then drained, dried, and calcined at 540° C. for 2 hours. The percentage composition by weight of the resulting pellets was NiO 9.8; CaO 0.1; $ZrO_2$ 2.2. This quantity of CaO was present as a stabilizer for the zirconium oxide.

Activation and Testing of the Catalyst

The oxide composition was diluted 30:70 with inert alumina pellets of the same size and charged to the tube (1 inch internal diameter) of a small-scale pilot plant, heated up to 750° C. and activated by passing a mixture of 10% v/v hydrogen in steam at 400 p.s.i.g. over it for 30 hours at an inlet temperature of 400° C. and an outlet temperature of 750° C. Desulphurised naphtha (0.1 p.p.m. S) boiling in the range 30–170°BH C. was then introduced into the steam flow and hydrogen supply was shut off. The proportion of naphtha was initially such as to give a steam/carbon ratio of 5, and the steam flow was then decreased progressively so as to give a ratio between 5 and 1.5. The liquid volume hourly space velocity of naphtha was 1.2 throughout. Table 1 shows the product gas compositions and the extent of the increase in pressure-drop (P.D.) through the catalyst bed. It is evident that no carbon was laid down at steam ratios of 2.5 and above and that carbon lay-down is very slow even at steam ratios down to 1.5. From the low content of benzene and toluene in the product gas it is evident that the catalyst is highly active.

TABLE 1

| Steam ratio | Product gas composition | | | | | | | P.D. across reformer | |
|---|---|---|---|---|---|---|---|---|---|
| | Percent | | | | | Mg./m.³ | | | Hrs. running |
| | CO | CH₄ | CO₂ | C₂H₆ | H₂ | C₆H₆ | C₇H₈ | P.s.i. | |
| 5.0 | 7.1 | 10.3 | 18.5 | 0.1 | 64.0 | 70 | <50 | Nil | 10 |
| 4.0 | 7.8 | 11.8 | 18.3 | 0.1 | 62.0 | <50 | <50 | Nil | 4 |
| 3.0 | 8.7 | 15.5 | 18.0 | 0.1 | 57.7 | <50 | <50 | Nil | 10 |
| 2.5 | 9.6 | 19.5 | 17.5 | 0.1 | 53.3 | <50 | <50 | Nil | 4 |
| 2.25 | 10.0 | 20.6 | 17.2 | 0.1 | 52.1 | <50 | <50 | 0–10 | 10 |
| 2.0 | 10.6 | 22.5 | 16.7 | 0.1 | 50.1 | 50 | <50 | 0–10 | 4 |
| 1.75 | 10.6 | 23.0 | 16.6 | 0.1 | 49.7 | 50 | <50 | 0–10 | 6 |
| 1.5 | 11.5 | 26.2 | 16.0 | 0.1 | 46.2 | 50–100 | 50 | 0–10 | 17 |

EXAMPLE 2

For this run a pilot plant having a single 4 inch internal diameter tube supported in a top-fired furnace was used. The bottom half of this tube was charged with catalyst as described in Example 1 but in the form of 16.5 × 16.5 mm. rings (hole diameter 6.5 mm.) and having the weight percentage composition NiO 10.0, $ZrO_2$ 3.4, CaO 0.17, balance $Al_2O_3$. The top half of the tube was charged with a nickel-magnesia-kaolin-cement catalyst containing 6.5 percent by weight of potassium oxide.

The catalysts were then reduced with steam and hydrogen at 850° C. whereafter there was passed downwardly a mixture of desulphurised naphtha (boiling range 30°–170° C.) and steam (steam ratio 3.4) at a pressure of 450 p.s.i.g., a bed exit temperature of 825° C. and a volume liquid hourly space velocity of 1.6 hour⁻¹. The issuing gas was cooled to condense out the excess steam and the condensate was analyzed for potassium at intervals. The potassium content of the condensate was found to be about 0.2–0.3 parts per million by weight calculated as $K_2O$; and this is to be compared with 5–6 parts per million when using the potassium-containing catalyst for the whole of the bed.

Using the same catalyst bed under lean town gas producing conditions (steam ratio 3.0, 750° C., 400 p.s.i.g., space velocity 1.0 hour⁻¹) the potassium oxide content of the condensate was 0.3 p.p.m., as against 1.0 p.p.m. when using only the potassium-containing catalyst. (This represents a lower rate of alkali volatilization than at 825° C., since the steam ratio and space velocity at 750° C. are lower than at 825° C).

No carbon lay-down was observed using the two-catalyst bed in either set of process conditions. At 750° C. it was found possible to operate at steam ratio as low as 2.0 without carbon lay-down.

The activity of the two-part catalyst bed was substantially higher than a bed of only the potassium containing catalyst. The gas composition (CO, $CO_2$, $H_2$ $CH_4$) obtained from the two-part bed at 825° C. corresponded to a temperature only 8° C. below the actual temperature as compared with 37° C. for the potassium-containing catalyst. Moreover the gas produced in runs at either temperature was free of aromatic hydrocarbons and ethane, in comparison with 1,700 mg./m.³ of dry gas of benzene + toluene with 1 percent ethane at 750° C., and 800 mg./m.³ of benzene and toluene with 0.6 percent ethane at 825° C., when using only the potassium-containing catalyst.

We claim:

1. A continuous process of steam reforming hydrocarbons with decreased carbon lay-down which comprises passing the hydrocarbons and steam over a substantially alkali-free catalyst comprising a metal selected from the group consisting of nickel and cobalt, said nickel and cobalt being in the range 2–40 percent, calculated as NiO or CoO and intimately associated with the dioxide of zirconium on a pre-formed refractory support.

2. A process according to claim 1 in which the proportion of nickel or cobalt in the catalyst is in the range 5–15 percent, calculated as NiO or CoO on the oxide form of the catalyst.

3. A process according to claim 1 in which the proportion of zirconia (apart from any zirconia in the pre-formed support) is from 0.1 to 2.0 times the content of NiO or CoO.

4. A process according to claim 1 in which the preformed support is substantially free of silica.

5. A process according to claim 1 in which the catalyst has been made by a method which comprises first impregnating a pre-formed support material with a zirconium compound and a compound decomposable to a zirconia-stabilising oxide and subsequently impregnating the treated support with a nickel or cobalt compound.

6. A process according to claim 5 in which the compounds of zirconium and of stabilizer metal are substantially decomposed to oxide at 500°–700° C. before impregnation with the nickel or cobalt compound.

7. A continuous process of steam reforming hydrocarbons with decreased carbon lay-down which comprises passing hydrocarbons and steam over a catalyst bed containing an alkali metal compound at the inlet portion of the bed, and having an alkali-free catalyst as defined in claim 1 at the outlet portion of the bed.

8. A process according to claim 1 in which the temperature is above 700° C.

* * * * *